United States Patent [19]

Dutta et al.

[11] Patent Number: 5,160,663
[45] Date of Patent: Nov. 3, 1992

[54] METHOD OF RECLAIMING LAMP PHOSPHOR

[75] Inventors: Arunava Dutta, Chestnut Hill; Leonard V. Dullea, Peabody, both of Mass.

[73] Assignee: GTE Products Corporation, Danvers, Mass.

[21] Appl. No.: 805,335

[22] Filed: Dec. 9, 1991

[51] Int. Cl.5 .................. C09K 11/01; C09K 11/78
[52] U.S. Cl. ................... 252/301.4 R; 423/21.1; 423/263
[58] Field of Search .............. 252/301.4 R; 423/263, 423/21.1

[56] References Cited

U.S. PATENT DOCUMENTS

| | | | |
|---|---|---|---|
| 3,474,040 | 10/1969 | Hedler et al. | 252/301.4 R |
| 3,506,585 | 4/1970 | Otsuka et al. | 252/301.4 R |
| 3,523,904 | 8/1970 | Single | 252/301.4 R |
| 3,668,140 | 6/1972 | Lagos et al. | 252/301.4 R |
| 3,846,328 | 11/1974 | McCue | 252/301.4 R |
| 3,864,273 | 2/1975 | Forbes et al. | |
| 3,941,714 | 3/1976 | Mathers et al. | 252/301.4 S |
| 3,954,657 | 5/1976 | Forest et al. | 252/301.4 S |

FOREIGN PATENT DOCUMENTS 246552  6/1987  German Democratic Rep. .............. 252/301.4 R

*Primary Examiner*—Jack Cooper
*Attorney, Agent, or Firm*—Robert E. Walter

[57] ABSTRACT

A fluorescent lamp phosphor product is recovered from a degraded aqueous suspension by treating a separated solids portion of the suspension with nitric acid to solubilize a decomposed portion of a rare earth activated yttrium oxide phosphor and form a remaining mixture of phosphors which may be reconstituted to a fluorescent lamp phosphor product suitable for use in a lamp.

14 Claims, 2 Drawing Sheets

METHOD OF RECLAIMING LAMP PHOSPHOR

TECHNICAL FIELD OF THE INVENTION

This invention relates to reclaiming lamp phosphors and other materials from a degraded water base fluorescent lamp phosphor coating suspension.

BACKGROUND OF THE INVENTION

In fabrication of fluorescent lamps, a blended phosphor layer is applied to the interior surface of a glass envelope using a liquid paint-like suspension of phosphor powder. The phosphor layer may be applied directly to the glass or may alternatively be applied to a previously applied coating of, for example, phosphor or reflective material.

Typically the phosphor blend is a triphosphor blend of a red phosphor, a green phosphor, and a blue phosphor formulated to produce white light output from a fluorescent lamp. A typical blend may include phosphor Types 2345, 2297 and 2461 manufactured by the Chemical & Metallurigical Division of GTE Products Corporation, Towanda, Pa. Type 2345, $Y_2O_3$:Eu, is made by firing a commercially obtained mixture of coprecipitated Yttrium (III) Oxide and Europium (III) Oxide, and then milling and sieving the fired material to produce the finished phosphor powder. This phosphor powder typically comprises tiny crystallites which have been agglomerated into particles having an average size of 3 to 3.5 micrometers as measured by Coulter Counter. Type 2297 is a Cerium Terbium Magnesium Aluminate: Cerium: Terbium phosphor, and 2461 is a Barium Magnesium Aluminate: Europium phosphor. Typical formulae for the 2461 and the 2297 are $BaMg_{2.4}Al_{16}O_{27}$:Eu (blue) and $(Ce,Tb)MgAl_{11}O_{19}$:Ce:Tb (green), respectively.

Although the composition of the phosphor coating suspension may vary from lamp manufacturer to lamp manufacturer, the suspension usually includes, in addition to the phosphor, a film forming binder, solvent(s) for the binder, and, if necessary, surfactants and defoamers. The coating suspension may further include submicron particle size alumina, e.g., Aluminum Oxide C, manufactured by Degussa, Inc. In GTE triphosphor coating suspensions, an Aluminum Oxide C content of 2 to 10% by weight of the phosphor is typical. The submicron particle size alumina assists in the formation of a uniform adherent phosphor layer on the lamp surface.

A problem with such aqueous blends of lamp phosphors is that the red-emitting phosphor $Y_2O_3$:Eu may undergo degradation in the water base phosphor coating suspension. The degradation is caused by dissolution and subsequent precipitation of the europium activated yttrium oxide phosphor in the water base suspension system. Dissolution of europium activated yttrium oxide causes further concerns when it is used as a component of a multicomponent blend, such as a triphosphor blend. The dissolution is caused by a drop in suspension pH resulting from the addition of Aluminum Oxide C which has acidic impurities. As the pH subsequently rises due to the inherent basic nature of the yttrium oxide phosphor, the dissolved yttrium and europium ions precipitate out in the form of a scum layer onto the surface of the phosphor particles. The scum layer precipitate contains mainly yttrium hydroxide and organometallic compounds, the latter evidenced by the interaction of the yttrium, europium and aluminum ions and the polymeric binder. The scum layer does not bake out within the normal temperature range of the ovens. This leads to a discolored lamp which is unacceptable.

Before a production run is made, small quantities of test lamps are made with the coating suspension. Once a multicomponent lamp suspension containing the yttrium oxide phosphor has become degraded, an unacceptable body color results after tests lamps coated with the degraded aqueous suspension are baked. So as to minimize environmental concerns for disposal of degraded phosphor suspensions, it is desirable to economically utilize the degraded phosphor suspensions. Heretofore, a method has not been developed for removing and reclaiming valuable components of the degraded aqueous suspension while producing a resulting phosphor blend that may be used for the manufacture of lamps free from discoloration.

SUMMARY OF THE INVENTION

In accordance with the present invention, there is provided a process for the recovery of a fluorescent lamp phosphor product from a degraded aqueous suspension of lamp phosphors which includes a rare earth activated yttrium oxide phosphor. A liquid portion of the degraded aqueous phosphor mixture is separated from a solids portion of an impaired phosphor mixture which includes a decomposed rare earth activated yttrium oxide phosphor. The impaired phosphor mixture is treated with nitric acid at a sufficient concentration and in a sufficient amount to solubilize the decomposed portion of the rare earth activated yttrium oxide phosphor. The resulting aqueous acid phosphor mixture is separated to form an aqueous acidic by-product and a mixture of phosphors. Since the deleterious decomposed portion of the rare earth activated yttrium oxide phosphor is contained in the removed liquid by product, the mixture of phosphors may be upgraded to a suitable lamp phosphor blend. The mixture of phosphors is dried and heated in an oxidizing atmosphere at a sufficient temperature so as to reconstitute the phosphors to their original chemical and physical state so as to form a fluorescent lamp phosphor product. The reconstituted phosphors constitute the product.

According to another embodiment of the present invention, the recovered fluorescent lamp phosphor product is restored to the color renditioning properties of the original phosphor blend by the addition of make-up phosphor to compensate for the change in color renditioning properties due to the removal of a portion of the rare earth activated yttrium oxide phosphor from the original mixture.

According to another embodiment of the present invention, yttrium oxide is recovered from the aqueous acid by-product from the nitric acid treatment step by treatment with an inorganic base followed by liquid/solid separation and subsequent heating.

Figure 1:
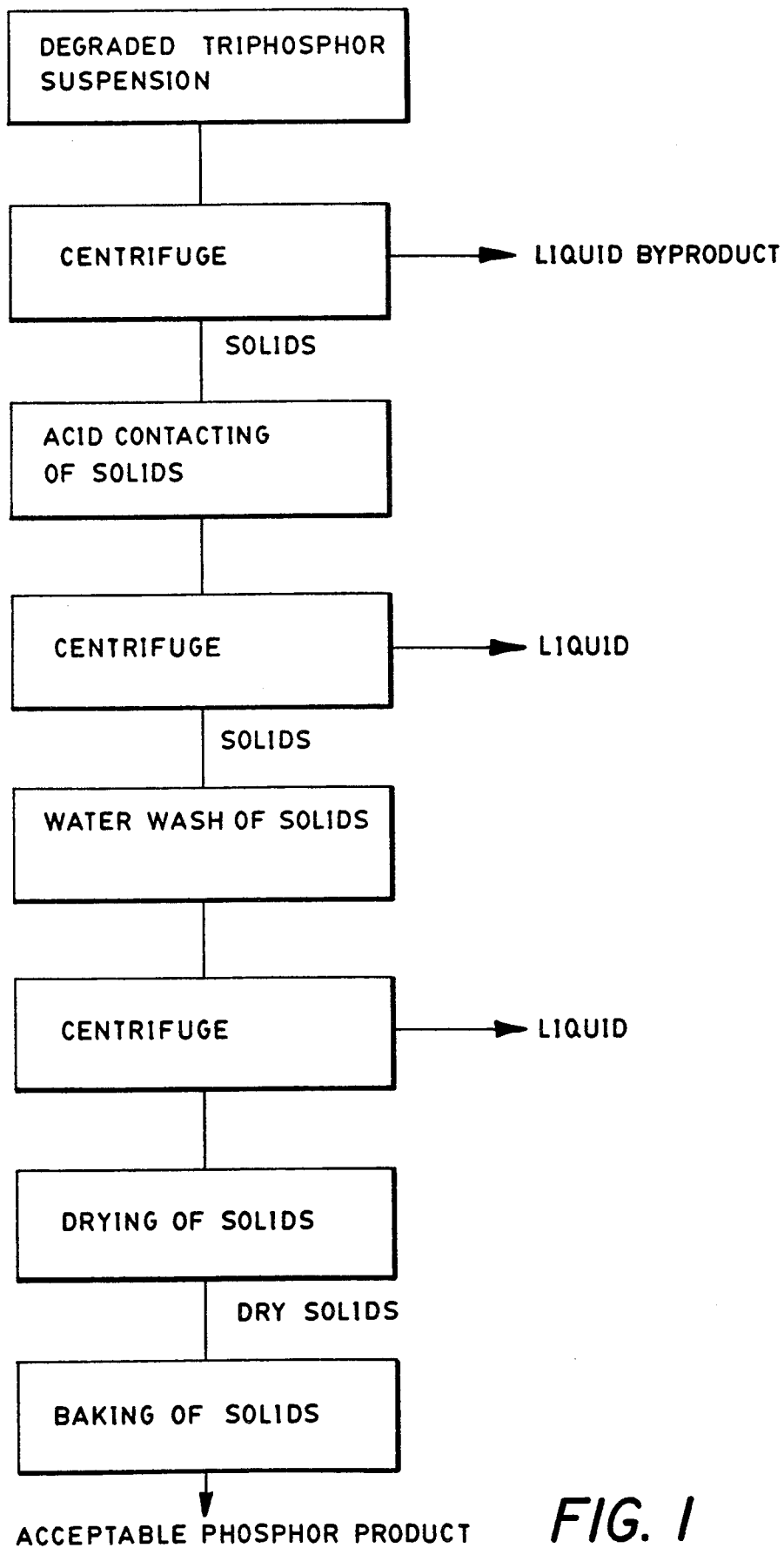
FIG. 1 is a flow sheet schematically illustrating the process steps for reclaiming a degraded triphosphor suspension.

For a better understanding of the present invention, together with other and further advantages and capabilities thereof, reference is made to the following disclosure and appended claims in connection with the above-described drawings.

DETAILED DESCRIPTION OF THE INVENTION

The starting aqueous mixture is a degraded mixture of lamp phosphors having impaired color renditioning properties. The aqueous mixture includes a rare earth activated yttrium oxide phosphor which has decomposed. The decomposition may be by dissolution as previously discussed. Typical rare earth elements are the chemically related elements in Group IIIA of the Periodic Table of elements. A typical composition of a triphosphor blend comprises 18.2 kg of red phosphor, 9.4 kg of green phosphor, 1.9 kg of blue phosphor. Additional ingredients typically include 37 liters of water, 2.95 kg of Aluminum Oxide C, 0.3 kg of poly(ethylene oxide) (POLYOX made by Union Carbide), 3.1 cc defoamer (Hercules type 831) and 1.3 cc surfactant (BASF 25R-1).

The mixture includes a red-emitting $Y_2O_3$:Eu phosphor and preferably a green and blue phosphor so as to give a preferred white light. The red-emitting $Y_2O_3$:Eu phosphor is present in a reusable form and a decomposed form rendering the aqueous mixture unsuited for lamp manufacture. As discussed earlier, the solubility of the $Y_2O_3$:Eu phosphor leads to transport of yttrium and europium in the form of various ions from the phosphor to the liquid phase. This leads to the formation of the scum layer, which, as discussed earlier, results in unacceptable body color in the lamp after bake out.

It is also believed that degradation or decomposition of the rare earth activated yttrium oxide phosphor may be caused by etching of the material along grain boundaries, leading to a decrease in particle size with time. The decrease in particle size deleteriously increases the solubility of the red phosphor and widens the difference in particle size between the red and the other two phosphors (green and blue) in the triphosphor suspension since the green and blue components do not suffer this degradation. The difference in particle sizes of the red and the other two phosphor components of the triphosphor blend results in separation of the components along the length of the lamp envelope during the coating process causing visually detectable color variation along the length of the lamp during lamp operation.

In accordance with the principles of the present invention, a liquid portion of the aqueous mixture is separated from a solids portion of the aqueous mixture. The separation may be conveniently performed by a solid-liquid separation step known in the art such as filtration, decanting, or centrifuging. Centrifuging is a preferred technique because of the speed and efficiency of the separation of the solids from the liquid. After centrifuging, most of the organic content of the suspension is present in the liquid portion. The liquid may also include a small portion of colloidal solids. The solids portion, resulting from the centrifuging step, includes both the reusable form and the degraded form of the red-emitting $Y_2O_3$:Eu phosphor. Additionally, the solids portion includes the green and blue phosphors that were dispersed in the lamp suspension together with other solids such as Aluminum Oxide C.

When a degraded lot of a triphosphor suspension was centrifuged at 1000 rpm for 30 minutes an upper liquid phase formed and a lower white colored phosphor containing phase formed. An intermediate thin mocha colored solids layer formed below the liquid as a top solids layer. This intermediate layer of thin colored solids is referred to as the "scum layer." The scum layer does not display fluorescence under 254nm or 365 nm radiation, and consists essentially of the degradation products of the $Y_2O_3$:Eu phosphor.

The scum material was dried and its thermal decomposition studied in a thermo gravimetric analyzer. The major weight loss occurs by about 300° C. and is about 76.2% of the initial mass. The scum, however, has a long thermal tail losing an additional 3% of initial mass over the next 700° which puts the temperature well beyond the range of most lamp bakeout furnaces. This leads to incomplete burnout of the scum and creates the lamp bakeout problem referred to earlier.

The dried scum material gave no diffraction pattern indicating that the scum layer is amorphous as formed. X-ray diffraction conducted after heating at about 1000° C. for 20 minutes in air confirmed the presence of yttrium. Hence, the scum is called a degraded portion of the red-emitting $Y_2O_3$:Eu phosphor.

The scum layer, as formed, was found to include hydroxo compounds of yttrium and aluminum, Polyox fragments and metal-organic complexes. The complexes are formed due to the affinity of Polyox in solution for different metal cations. In this case, yttrium, europium, aluminum ions are available in solution to complex with the polymer. The reaction kinetics and endothermicity of the constituents of the scum layer lead to the bakeout problems referred to earlier.

Next, the entire solids portion resulting from the centrifugation step is treated with nitric acid at a sufficient concentration and in a sufficient amount to solubilize the degraded portion of the red-emitting $Y_2O_3$:Eu phosphor and form a remaining solids portion containing the reusable portion of the red emitting phosphor. It is believed that the nitric acid solubilizes the undesirable components of the solids portion leaving a desired phosphor residue or remaining portion that is suited for lamp manufacture. The remaining solids portion also preferably includes additional reusable portions of other phosphors present in the initial starting blend.

Preferably the nitric acid utilized is concentrated, with a normality greater than about 10 and preferably greater than about 13. The solids are preferably mixed or stirred in the presence of the nitric acid so as to achieve sufficient contact between the solid and liquid phase to promote the solubilization of the deleterious materials in the phosphor mix. The initial contact time with the concentrated nitric acid is for a relatively short period of time, preferably on the order of from about 5 to about 20 minutes so that the "scum" is solubilized but the bulk of the phosphor remains in solid form. Although less concentrated solutions of nitric acid may be utilized, the increased contact time needed makes less concentrated nitric acid solutions less desirable.

After the initial contact of the solids with concentrated nitric acid, the mixture of concentrated nitric acid and solids is diluted with water so as to form a less concentrated solution of nitric acid containing the solids. The resulting solution has a normality sufficient to solubilize any remaining "scum." Preferably the normality of the resulting nitric acid solution is from about 1.5 to about 3 normal. Since aluminum and yttrium compounds in the scum layer are soluble to a certain extent in the dilute acid, longer contact times on the order of about 5 to about 30 hours are preferred.

In accordance with the principles of the present invention, substantially all of the deleterious agents responsible for a discolored lamp are solubilized during the nitric acid treatment. Since a portion of each of the various phosphors that make-up the phosphor blend is also likely to be solubilized during the nitric acid treatment, the proportions of phosphors present is altered during the nitric acid treatment. Thus, the color renditioning properties of the mix is altered by the nitric acid treatment step.

The amount of nitric acid utilized is desirably more than the stoichiometric amount of nitric acid needed for reacting with the deleterious scum including the degraded portion of the red phosphor. Typical amounts based on the amount of red phosphor in the initial blend is from about 0.2 to about 1 of the stoichiometric amount needed to react with the red phosphor in the initial blend. Amounts in excess of this amount may undesirably solubilize a portion of the phosphor mix that is suitable for producing a phosphor mix free from discoloration.

Next, a liquid portion containing the solubilized degraded portion of the phosphor is separated from the solid portion containing a reusable portion of the phosphor mix. This step may be performed by liquid/solid separation techniques known in the art as hereinbefore described. Centrifuging is a preferred separation technique. The remaining solids are preferably washed to remove remaining acid and dried preferably at about 125 degrees Centigrade for about 24 hours.

To enhance the properties of the phosphor prior to reuse, the dried phosphor mixture is preferably heated in an oxidizing atmosphere at a sufficient temperature so as to reconstitute the phosphor to its original chemical and physical state. Preferably the heating is performed at a temperature of from about 450 to about 550 degrees Centigrade for 4 to 8 hours in the presence of an oxygen containing gas. Preferably the gas flows over and around the dried phosphor mixture to achieve good contact with the dried phosphor.

Although the above reclaimed phosphor mix may be utilized directly for a fluorescent lamp, the color point may deviate from the color point of the original mixture or the desired color point. When the red europium doped yttrium oxide phosphor component of a triphosphor blend dissolves in the coating suspension, the formulation of the blend is changed, thus requiring additional amounts of the red phosphor to be added to the suspension to replace the red phosphor that has dissolved and correct the color imbalance caused by such dissolution. Thus, additional phosphors may be added to shift the color point to the desired color point.

According to another embodiment of the present invention, yttrium oxide is recovered from the liquid portions produced during the restoration of the phosphor. The liquid portion or by-product from the nitric acid treatment step is preferably treated with an inorganic base to form hydroxides of yttrium, europium and aluminum which may be recovered by liquid/solid separation and subsequently converted to the oxides. The acid solution resulting from the nitric acid treatment step is the primary by-product stream. Washings may be added to this stream or treated individually. The resulting aqueous acid by-product includes the yttrium nitrate, europium nitrate, and other nitrates such as aluminum nitrate depending on the constituency of the original phosphor mixture.

The aqueous by-product is preferably treated with a base to precipitate metal hydroxides such as yttrium hydroxide, europium hydroxide, and aluminum hydroxide. Such treatment is preferably performed by adding an inorganic base such as ammonium hydroxide and adjusting the pH to about 10. The hydroxides are dried at about 150 degrees Centigrade for about 36 hours, then heated at 750 to 800 degrees Centigrade for 8 hours to convert them to the oxides. Since aluminum oxide is a necessary ingredient in phosphor blend compositions, the presence of this compound is not deleterious. The yttrium and europium oxides are valuable materials which can be recycled for the preparation of additional phosphor.

Experiments Involving Degraded Water Base Phosphor Suspensions Including $Y_2O_3$:Eu The following experiments were conducted on a degraded lot of a triphosphor suspension. The triphosphor blend originally included $Y_2O_3$:Eu phosphor (GTE Type 2345), cerium terbium magnesium aluminate: cerium: terbium phosphor (e.g., GTE Type 2297); and barium magnesium aluminate: europium phosphor (e.g., GTE Type 2461). The solids content of this suspension, measured by drying of the same, is 21 percent. According to the specifications for this blend, 2 percent of the solids content is Aluminum Oxide C while 65 percent of the balance of the solids is the red yttrium oxide: europium phosphor. Due to the red dissolution in a degraded sample, the actual percentage of red in the triphosphor is less than the value obtained from the specification.

A sample of 4.007 kg of the suspension was centrifuged at 3000 rpm for 30 minutes, giving rise to an upper liquid phase at the bottom of which was a thin mocha colored solids layer below which lay a white solids mass viz. the phosphor. The intermediate layer of thin colored solids has been referred to earlier as the "scum layer." The scum layer does not display fluorescence under 254nm or 365 nm radiation.

The liquid layer containing most of the organic content of the suspension is decanted off. The decanted liquid layer also contains colloidal solid particles of Aluminum Oxide C and the red phosphor.

Next, 0.865 liter of 15.8 N nitric acid was poured into a high density polyethylene bottle containing the solid residue from the centrifuging step. The amount added was 75 percent of the amount theoretically needed to react with the red phosphor content of the solids. After about 10 minutes, the contents of the bottle was diluted by the addition of one liter of deionized water and the entire contents were stirred for 18 hours. The maximum temperature reached during the acid contacting was about 80 degrees Centigrade.

The contents of the bottle were centrifuged at 3000 rpm for 10 minutes. The liquid layer resulting from the centrifugation is referred to as a by-product. The solids, left at the bottom of the centrifuge tubes were washed twice with distilled water. Each washing was followed by a centrifuging step.

The washed solids were dried at 125 degrees Centigrade for 24 hours. Next, the material was fired at 500 degrees Centigrade for about 6 hours in the presence of a two slm flow of oxygen before cooling the material to room temperature. The product is a free flowing, white material. It has a green fluorescence under 254 nm radiation. The fluorescence due to the blue phosphor is masked by light from the green because the latter has a higher percent in the blend and the eye is much more sensitive to green than blue light. FIG. 1 is a schematic of the various steps in the reclamation procedure.

A water base suspension was then made up using this product, and F30T12 lamps were coated with the material. No other phosphors were added to the blend. Photometric results show a mean lumen level of 3086. No lamp discoloration was observed after bakeout, demonstrating clearly that the scum layer had been removed.

Another suspension, the control, was made up using fresh phosphors and F30T12 lamps were coated. In order for the color point for the control lot to match that resulting from the reclamation product, the control blend needed green and blue phosphors in a 93%/7% amount. No red phosphor was needed in the control blend which had a color point of x=0.3008, y=0.5163 which compares well to the product blend color point of x=0.3014, y=0.5157. The mean lumen level for the control was 3260. Table I lists the results of the photometric tests. The reclamation product has about 95% of the brightness of the control at 0 hours and 94.7 percent of the brightness of the control at 100 hours. In addition, the 0 to 100 hour maintenance of the reclaimed product is 98.3 percent as compared to 97.9 percent for the control.

Liquid By Product Processing

Figure 2:
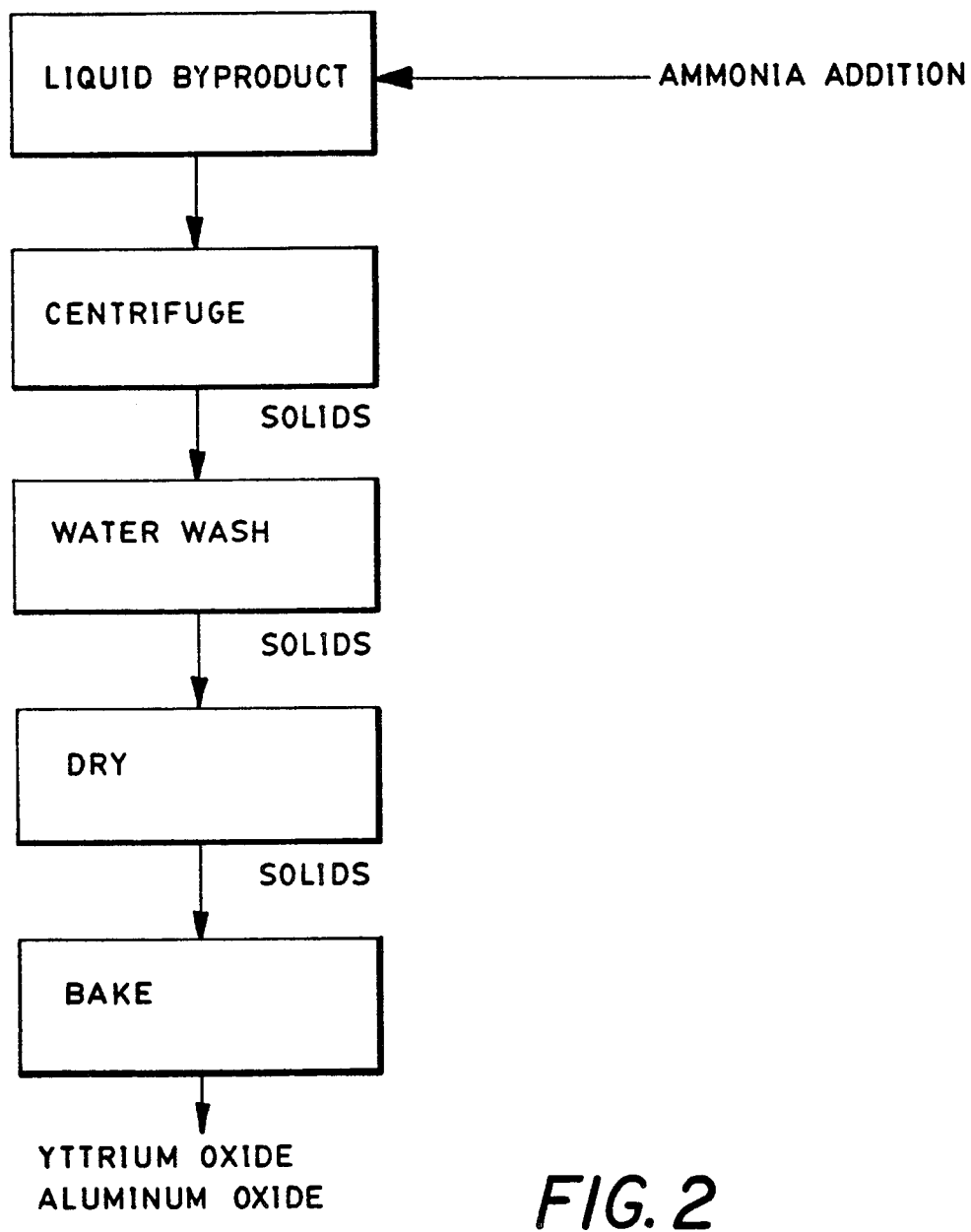
FIG. 2 is a flow sheet schematically illustrating the process steps for recovering yttrium oxide and aluminum oxide from the liquid by product.

The by-product aqueous acid solution containing yttrium, europium and aluminum nitrates is brought to a pH of about 10 at which point hydroxides of yttrium, europium and aluminum precipitate. The suspension is next centrifuged and the solids washed with deionized water until the wash water shows no further decrease in nitrate ion concentration. Next, the solids are dried at 150 degrees Centigrade for 36 hours and finally baked at 750 degrees Centigrade for 8 hours. The baking converts the hydroxides to the oxides. The product is essentially dominated by yttrium oxide with small amounts of europium and aluminum oxide. Since aluminum oxide is a necessary ingredient in phosphor blend compositions, the presence of this compound is not deleterious. The yttrium and europium oxides are valuable materials which can be recycled for the preparation of additional phosphor. FIG. 2 is a schematic of the steps used in the by product processing.

TABLE I

| PHOTOMETRIC TESTS ON RECLAIMED PRODUCT AND CONTROL | | | | | |
|---|---|---|---|---|---|
| LAMP | HOUR | VOLTS | AMPS | WATTS | LUMEN |
| CONTROL | | | | | |
| 1 | 0 | 79.8 | 0.431 | 31.5 | 3217 |
| 2 | 0 | 79.9 | 0.431 | 31.2 | 3276 |
| 3 | 0 | 79.2 | 0.431 | 30.9 | 3269 |
| 4 | 0 | 79.9 | 0.430 | 31.3 | 3265 |
| 5 | 0 | 79.3 | 0.432 | 31.1 | 3275 |
| MEAN | 0 | 79.6 | 0.431 | 31.2 | 3260 |
| 1 | 100 | 78.9 | 0.433 | 31.3 | 3174 |
| 2 | 100 | 79.0 | 0.434 | 30.7 | 3203 |
| 3 | 100 | 78.6 | 0.433 | 30.9 | 3212 |
| 4 | 100 | 79.9 | 0.430 | 31.2 | 3196 |
| 5 | 100 | 79.4 | 0.432 | 31.3 | 3176 |
| MEAN | 100 | 79.2 | 0.432 | 31.1 | 3192 |
| RECLAIMED PRODUCT | | | | | |
| 1 | 0 | 79.6 | 0.431 | 31.3 | 3104 |
| 2 | 0 | 79.4 | 0.432 | 31.3 | 3091 |
| 3 | 0 | 79.9 | 0.433 | 31.8 | 3080 |
| 4 | 0 | 79.7 | 0.431 | 31.4 | 3069 |
| MEAN | 0 | 79.7 | 0.432 | 31.5 | 3086 |
| 1 | 100 | 78.7 | 0.434 | 31.1 | 3045 |
| 2 | 100 | 80.3 | 0.430 | 31.5 | 3033 |
| 3 | 100 | 79.0 | 0.435 | 31.4 | 3029 |
| 4 | 100 | 79.1 | 0.432 | 31.0 | 3019 |
| MEAN | 100 | 79.3 | 0.433 | 31.3 | 3032 |

While there have been shown and described what at present are considered preferred embodiments of the invention, it will be apparent to those skilled in the art that various changes and modifications may be made herein without departing from the scope of the invention as defined by the appended claims.

What is claimed is:

1. A process for the recovery of a fluorescent lamp phosphor product from a degraded aqueous suspension of lamp phosphors comprising a red $Y_2O_3$:Eu phosphor, a blue $BaMg_2Al_{16}O_{27}$:Eu phosphor, and a green $(Ce,Tb)MgAl_{11}O_{19}$:Ce,Tb phosphor and a decomposed portion of said red $Y_2O_3$:Eu phosphor in the form of a scum layer including yttrium hydroxide on the surface of said phosphors comprising the steps of a) separating a liquid portion of the degraded aqueous phosphor suspension from a solids portion containing said decomposed europium activated yttrium oxide phosphor, b) treating said solids portion with nitric acid at a sufficient concentration and in a sufficient amount to solubilize said decomposed portion of said europium activated yttrium oxide phosphor to form an aqueous acid by-product, c) separating said aqueous acid by-product containing said solubilized decomposed portion of said europium activated yttrium oxide phosphor from a remaining solids portion comprising a mixture of said phosphors, d) drying and heating said mixture of phosphors in an oxygen containing atmosphere at a temperature of about 450° C. to about 55° C. to form a fluorescent lamp phosphor product in which the phosphors contained therein are reconstituted to their chemical and physical form prior to degradation.

2. A process for the recovery of a fluorescent lamp phosphor product according to claim 1 wherein said aqueous acid by-product from step c) is treated with an aqueous basic solution to increase the pH and form a solid yttrium containing precipitate.

3. A process for the recovery of a fluorescent lamp phosphor product according to claim 1 wherein said degraded aqueous suspension is derived from an original blend of lamp phosphors and said fluorescent lamp phosphor product is restored to the color renditioning properties of said original fluorescent lamp phosphor blend by the addition of make-up phosphor to compensate for the change in color renditioning properties due to the removal of decomposed phosphor from the original blend.

4. A process for the recovery of a fluorescent lamp phosphor product according to claim 1 wherein additional amounts of said europium activated yttrium oxide phosphor are added to said fluorescent phosphor product to replace the decomposed europium activated yttrium oxide phosphor.

5. A process for the recovery of a fluorescent lamp phosphor product according to claim 1 wherein said nitric acid comprises a concentrated nitric acid having a normality greater than about 10 and said nitric acid treating comprises an initial contact time with said concentrated nitric acid.

6. A process for the recovery of a fluorescent lamp phosphor product according to claim 5 wherein said initial contact time is from about 5 to about 20 minutes.

7. A process for the recovery of a fluorescent lamp phosphor product according to claim 5 wherein, after said initial contact step, said nitric acid treating comprises diluting with water so as to decrease the concentration of said nitric acid.

8. A process for the recovery of a fluorescent lamp phosphor product according to claim 7 wherein said nitric acid of decreased concentration has a normality sufficient to solubilize any remaining scum.

9. A process for the recovery of a fluorescent lamp phosphor product according to claim 8 wherein the normality of said nitric acid of reduced concentration is from about 1.5 to about 3.0.

10. A process for the recovery of a fluorescent lamp phosphor product according to claim 9 wherein said degraded aqueous suspension of fluorescent lamp phosphors comprise deleterious discoloring agents and substantially all of said deleterious discoloring agents are solubilized during the nitric acid treatment.

11. A process for the recovery of a fluorescent lamp phosphor product according to claim 5 wherein said amount nitric acid comprises more than the stoichiometric amount of nitric acid needed for reacting with the deleterious discoloring agents including the degraded portion of the red $Y_2O_3$:Eu phosphor.

12. A process for the recovery of a fluorescent lamp phosphor product according to claim 11 wherein said amount is from about 0.2 to about 1 of the stoichiometric amount needed to react with the red $Y_2O_3$:Eu phosphor in (all) blended suspension of fluorescent lamp phosphor product.

13. A process for the recovery of a fluorescent lamp phosphor product according to claim 12 wherein said remaining solids portion comprising a mixture of said phosphors is washed to remove remaining acid prior to drying and heating in an oxygen containing atmosphere.

14. A process for the recovery of a fluorescent lamp phosphor product according to claim 13 wherein said drying is performed at a temperature of about 125 degrees Centigrade.

* * * * *